US011922477B2

(12) United States Patent
Yogi

(10) Patent No.: US 11,922,477 B2
(45) Date of Patent: Mar. 5, 2024

(54) OBJECT EXCHANGE ASSISTANT SYSTEM

(71) Applicant: Photonon Inc., Tokyo (JP)

(72) Inventor: Takeshi Yogi, Tokyo (JP)

(73) Assignee: PHOTONON INC., Tokyo (JP)

(*) Notice: Subject to any disclaimer, the term of this patent is extended or adjusted under 35 U.S.C. 154(b) by 0 days.

(21) Appl. No.: 16/615,786

(22) PCT Filed: May 23, 2018

(86) PCT No.: PCT/JP2018/019810
§ 371 (c)(1),
(2) Date: Nov. 21, 2019

(87) PCT Pub. No.: WO2018/216724
PCT Pub. Date: Nov. 29, 2018

(65) Prior Publication Data
US 2020/0184536 A1    Jun. 11, 2020

Related U.S. Application Data

(60) Provisional application No. 62/511,357, filed on May 26, 2017.

(51) Int. Cl.
*G06Q 30/00*    (2023.01)
*G06Q 20/12*    (2012.01)
(Continued)

(52) U.S. Cl.
CPC ......... *G06Q 30/0629* (2013.01); *G06Q 20/12* (2013.01); *G06Q 30/0283* (2013.01)

(58) Field of Classification Search
CPC ......... G06Q 30/06–08; G06Q 30/0629; G06Q 20/12; G06Q 30/0283
See application file for complete search history.

(56) References Cited

U.S. PATENT DOCUMENTS

2003/0088497 A1    5/2003    Belgrano
2008/0147479 A1    6/2008    Johnson
(Continued)

FOREIGN PATENT DOCUMENTS

JP    2002007790 A    1/2002
JP    2002-230331 A    8/2002
(Continued)

OTHER PUBLICATIONS

Investopedia: bid and ask, (Year: NA).*
(Continued)

*Primary Examiner* — Robert M Pond
(74) *Attorney, Agent, or Firm* — Procopio, Cory, Hargreaves & Savitch LLP

(57) ABSTRACT

The present invention provides an information processing device including: a storage unit that is configured to store an object ID of an object, a user ID of a user owning the object, a first price of the object, a second price of the object, and an exchange condition of the object in association with one another; a price setting terminal that is configured to determine the first price; an appropriate exchange object selecting unit that is configured to select an appropriate exchange object in accordance with the exchange condition; a price comparing unit that is configured to compare the second price of an object of an exchange destination selected by the appropriate exchange object selecting unit with the first price of an object of an exchange source; a payment amount calculating unit that is configured to determine a payment amount of a user owning the object of the exchange source; a first transmission unit that is configured to notify a user terminal of the user owning the object of the exchange source of the payment amount; a payment checking terminal that is configured to check payment information from the user owning the object of the exchange source; and a setting (Continued)

unit that is configured to set the stored object ID corresponding to the exchange condition to an object ID of an object after an exchange in accordance with the payment information.

18 Claims, 3 Drawing Sheets

(51) Int. Cl.
*G06Q 30/0283* (2023.01)
*G06Q 30/0601* (2023.01)

(56) References Cited

U.S. PATENT DOCUMENTS

2013/0024309 A1 1/2013 Sandholm
2016/0292672 A1* 10/2016 Fay .................... G06Q 20/3829

FOREIGN PATENT DOCUMENTS

| JP | 2002-312617 A | 10/2002 |
| JP | 2014-044488 A | 3/2014 |
| JP | 2015-118673 A | 6/2015 |
| JP | 2017-010100 A | 1/2017 |

OTHER PUBLICATIONS

Barter definition, Investopedia. (Year: NA).*
"Exchange your goods through the internet," Peters, Melanie. Sunday Tribune [Durban] May 4, 2008: 11; Dialog #431107568, 2pgs. (Year: 2008).*
International Search Report for related International Application No. PCT/JP2018/019810, dated Jul. 3, 2018; English translation of ISR provided (4 pages).
Office Action dated May 31, 2022 in counterpart JP Patent Application No. 2019-106530, 6 pages.

* cited by examiner

| USER ID | NAME | ADDRESS | USER INFORMATION | EXCHANGE CONDITION ID | HISTORY ID |
|---|---|---|---|---|---|
| U1001 | TARO NAGAMONO | TOKYO ... | HAVING INTEREST IN OUTDOOR | T2011 | H2088 |
| U1002 | JOH YAMADA | KANAGAWA ... | COLLECTOR OF TRADING CARD (TDC) | T2012, T2015 | |
| ... | | | | | |

FIG. 2B

| OBJECT ID (220) | OBJECT NAME (221) | PHOTOGRAPH (222) | OBJECT INFORMATION (223) |
|---|---|---|---|
| G1010 | TRADING CARD A (TDC-A) | G1010.jpg | NO DAMAGE |
| G1011 | OUTDOOR LAMP | G1011.jpg | THERE IS ONE DAMAGED SPOT |
| G1012 | CHAIR FOR CAMP | G1012.jpg | NO DAMAGE |
| ... | | | |

FIG. 2C

| EXCHANGE CONDITION ID (230) | OBJECT ID (231) | EXCHANGE REPETITION STOP CONDITION (232) | FIRST PRICE (233) | SECOND PRICE (234) | EXCHANGE-WANTED OR EXCHANGE REFUSAL CONDITION (235) | UPDATE TIME (236) |
|---|---|---|---|---|---|---|
| T2011 | G1010 | NONE | 7000 YEN | 3000 YEN | WANTED PRODUCT: CAMP-RELATING TOOL | 2017/4/4 ... |
| T2012 | G1011 | AT TIME OF OBTAINING TDC-A | | 4000 YEN | WANTED PRODUCT: TDC-A | 2017/3/1 ... |
| T2015 | G1012 | AT TIME OF OBTAINING TDC-A | | 2000 YEN | WANTED PRODUCT: TDC-A | 2017/3/1 ... |
| ... | | | | | | |

FIG. 2D

| HISTORY ID (240) | EXCHANGE SOURCE USER ID (241) | EXCHANGE DESTINATION USER ID (242) | EXCHANGE SOURCE OBJECT ID (243) | EXCHANGE DESTINATION OBJECT ID (244) | EXCHANGE TIME (245) |
|---|---|---|---|---|---|
| H2088 | U1001 | U0231 | G0311, G0422 | G1010 | 2016/11/1 ... |
| ... | | | | | |

OBJECT EXCHANGE ASSISTANT SYSTEM

CROSS-REFERENCE TO RELATED APPLICATIONS

This application is a U.S. National Stage entry of PCT Application No: PCT/JP2018/019810 filed on May 23, 2018, which claims priority to U.S. Provisional Patent Application No. 62/511,357 filed on May 26, 2017, the contents of which are incorporated herein by reference.

Priority is claimed on U.S. Provisional Patent Application No. 62/511,357, filed May 26, 2017, the content of which is incorporated herein by reference.

TECHNICAL FIELD

The present invention relates to a device that assists with a commercial transaction accompanying exchange of objects.

BACKGROUND ART

In recent years, commercial transactions between business enterprises, between a business enterprise and an individual, or between individuals using the Internet have been actively performed. Most are services for buying and selling products and services with money. Meanwhile, object exchange services for exchanging products or objects using the Internet have also been provided.

In Patent Document 1, a simplified method of managing barter bills for converting a seller's product into a barter bill, similar to normal currency, after approvals of a seller and a buyer using the barter bill that is dedicated currency for object exchange and using the converted barter bill for other transactions has been proposed. At that time, transfer of ownership of the product is not simultaneous exchange between products but is in one direction from a seller side to a buyer side.

In Patent Document 2, in order to continuously perform object exchange, a method for performing object exchange after an object exchange proposal from a product owner before exchange is approved by an exchange destination product owner and posting the product after exchange at an object exchange place again without re-registration of the product after exchange has been proposed.

CITATION LIST

Patent Document

[Patent Document 1]
Japanese Unexamined Patent Application, First Publication No. 2002-230331
[Patent Document 2]
Japanese Unexamined Patent Application, First Publication No. 2015-118673

SUMMARY OF INVENTION

Technical Problem

However, in Patent Document 1 described above, a seller receives currency for object exchange called a barter bill from a buyer at the time of selling his or her product, and a buyer obtains another person's product using his or her barter bill, which is not simultaneous exchange between products and is no different from a buying/selling means using normal currency. For this reason, a product cannot be directly exchanged with another person's product.

In addition, in Patent Document 2 described above, an exchange is not approved when an exchange proposal from a product owner before exchange is not approved by an exchange destination product owner, and there is no function for adjusting a price and the like in a case in which values of products of an exchange source and an exchange destination are not regarded to be the same.

In addition, in buying and selling using currency, there are cases in which an object cannot be traded in a case in which the function of a country disappears, and the relative value of a currency varies extremely.

The present invention is in view of the situations described above, and an object thereof is to provide an information processing device that has a price adjustment function and is capable of continuing simultaneous exchanges between objects such as products a plurality of times without approval from an exchange destination object owner.

Solution to Problem

Hereinafter, one example of an embodiment of the present invention will be shown.

An information processing device according to a first aspect of the present invention includes: a storage unit that is configured to store an object ID of an object, a user ID of a user owning the object, a first price of the object, a second price of the object, and an exchange condition of the object in association with one another; a price setting terminal that is configured to determine the first price; an appropriate exchange object selecting unit that is configured to select an appropriate exchange object in accordance with the exchange condition; a price comparing unit that is configured to compare the second price of an object of an exchange destination selected by the appropriate exchange object selecting unit with the first price of an object of an exchange source; a payment amount calculating unit that is configured to determine a payment amount of a user owning the object of the exchange source; a first transmission unit that is configured to notify a user terminal of the user owning the object of the exchange source of the payment amount; a payment checking terminal that is configured to check payment information from the user owning the object of the exchange source; and a setting unit that is configured to set the stored object ID corresponding to the exchange condition to an object ID of an object after an exchange in accordance with the payment information.

In addition, an information processing device according to a second aspect of the present invention, in the first aspect described above, further includes a first reception unit that is configured to receive the exchange condition from the user terminal.

In addition, an information processing device according to a third aspect of the present invention, in any one of the first and second aspects described above, further includes at least one of a second reception unit that is configured to receive the second price from the user terminal of the user owning the object and a unit that is configured to cause the price setting terminal to set the second price.

In addition, in an information processing device according to a fourth aspect of the present invention, in any one of the first to third aspects described above, the exchange condition includes an exchange stop condition.

In addition, in an information processing device according to a fifth aspect of the present invention, in any one of the first to fourth aspects described above, the appropriate exchange object selecting unit is configured to select a plurality of objects owned by a user of the exchange source, and the price comparing unit is configured to compare the second price of the object of the exchange destination with a price acquired by summing up first prices of the plurality of objects owned by the user of the exchange source.

In addition, in an information processing device according to a sixth aspect of the present invention, in any one of the first to fifth aspects described above, the appropriate exchange object selecting unit is configured to select a plurality of objects owned by a user of the exchange destination, and the price comparing unit is configured to compare a price acquired by summing second prices of the plurality of objects owned by the user of the exchange destination with the first price of the object of the exchange source.

In addition, in an information processing device according to a seventh aspect of the present invention, in any one of the first to sixth aspects described above, the storage unit is configured to store a history ID associated with an exchange source user ID, an exchange destination user ID, an exchange source object ID, and an exchange destination object ID at the time of exchange, is also configured to store user information in association with the user ID, and is also configured to store object information in association with the object ID.

In addition, in an information processing device according to an eighth aspect of the present invention, in any one of the first to seventh aspects described above, the price setting terminal is configured to use at least one of the user information, the object information, the exchange condition, the history ID, the second price, an input from an input unit of the price setting terminal, and a price database stored in a storage unit of the price setting terminal (and a transaction history stored in a block chain; please review description presented above).

In addition, in an information processing device according to a ninth aspect of the present invention, in any one of the first to eighth aspects described above, at least any one of a control unit, a storage unit, and a counting unit of the price setting terminal is included in a server.

In addition, in an information processing device according to a tenth aspect of the present invention, in any one of the first to ninth aspects described above, the storage unit is configured to store second prices of an exchange source object and an exchange destination object after an exchange on the basis of any one of the first price and the second price of the exchange source object before the exchange, the first price of the exchange destination object before the exchange, and a price set in advance after establishment of the object exchange.

In addition, in an information processing device according to an eleventh aspect of the present invention, in any one of the first to tenth aspects described above, the payment amount is set to zero in a case in which a difference of a sum of second prices of objects of the exchange destination from a sum of first prices of the object of the exchange source is equal to or smaller than a predetermined value.

In addition, in an information processing device according to a twelfth aspect of the present invention, in any one of the first to eleventh aspects described above, the price database stored in the storage unit of the price setting terminal includes the object information and the second price.

In addition, an information processing device according to a thirteenth aspect of the present invention, in any one of the first to twelfth aspects described above, further includes an object storing and managing terminal that is configured to store and manages the object.

In addition, in an information processing device according to a fourteenth aspect of the present invention, in any one of the first to thirteenth aspects described above, the storage unit is configured to store a block chain formed from a block including update information of information stored in the storage unit.

In addition, an information processing method according to a fifteenth aspect of the present invention includes: a storing process of storing an object ID of an object, a user ID of a user owning the object, a first price of the object, a second price of the object, and an exchange condition of the object in association with one another; a price setting process of determining the first price; an appropriate exchange object selecting process of selecting an appropriate exchange object in accordance with the exchange condition; a price comparing process of comparing the second price of an object of an exchange destination selected in the appropriate exchange object selecting process with the first price of an object of an exchange source; a payment amount calculating process of determining a payment amount of a user owning the object of the exchange source; a first transmission process of notifying a user terminal of the user owning the object of the exchange source of the payment amount; a payment checking process of checking payment information from the user owning the object of the exchange source; and a setting process of setting the stored object ID corresponding to the exchange condition to an object ID of an object after an exchange in accordance with the payment information.

Above all, the present invention is not limited to such forms, and, for example, in a case in which a sum of first prices of objects of the exchange source with respect to a sum of second prices of objects of the exchange destination is equal to or greater than a set value, the payment amount described above may not be notified to a user terminal of a user owning the objects of the exchange source.

Effects of Invention

According to the present invention, there are advantages of having a price adjustment function and being capable of continuing simultaneous exchanges between objects a plurality of times without approval from an exchange destination object owner.

In addition, according to the present invention, since simultaneous exchanges between objects can be continued a plurality of times without an approval from an exchange destination object owner, a user's effort for newly performing an object exchange can be omitted.

In addition, according to the present invention, by setting an exchange condition in advance, it is not necessary to obtain approval of an owner of an exchange source object and an exchange destination object owner for each exchange, and simultaneously exchanges between objects can continue a plurality of times. Accordingly, a time until each user owns a desired object through an object exchange can be shortened.

In addition, according to the present invention, objects owned by a user can be prevented from being unused and discarded in accordance with a mismatch of object exchanges, and the reuse rate of objects owned by a specific user that are used by other users can be improved. In addition, there is an advantage of avoiding a possibility of transactions of objects being greatly influenced in accordance with variations in the value of currency.

BRIEF DESCRIPTION OF DRAWINGS

FIG. 2B is a diagram showing the configuration of an object table according to one embodiment of the present invention.

FIG. 2C is a diagram showing the configuration of an exchange condition table according to one embodiment of the present invention.

FIG. 2D is a diagram showing the configuration of a history table according to one embodiment of the present invention.

DESCRIPTION OF EMBODIMENTS

Hereinafter, an information processing device according to one embodiment of the present invention will be described in detail with reference to the drawings.
[Description of each component]

Figures 1, 2A:
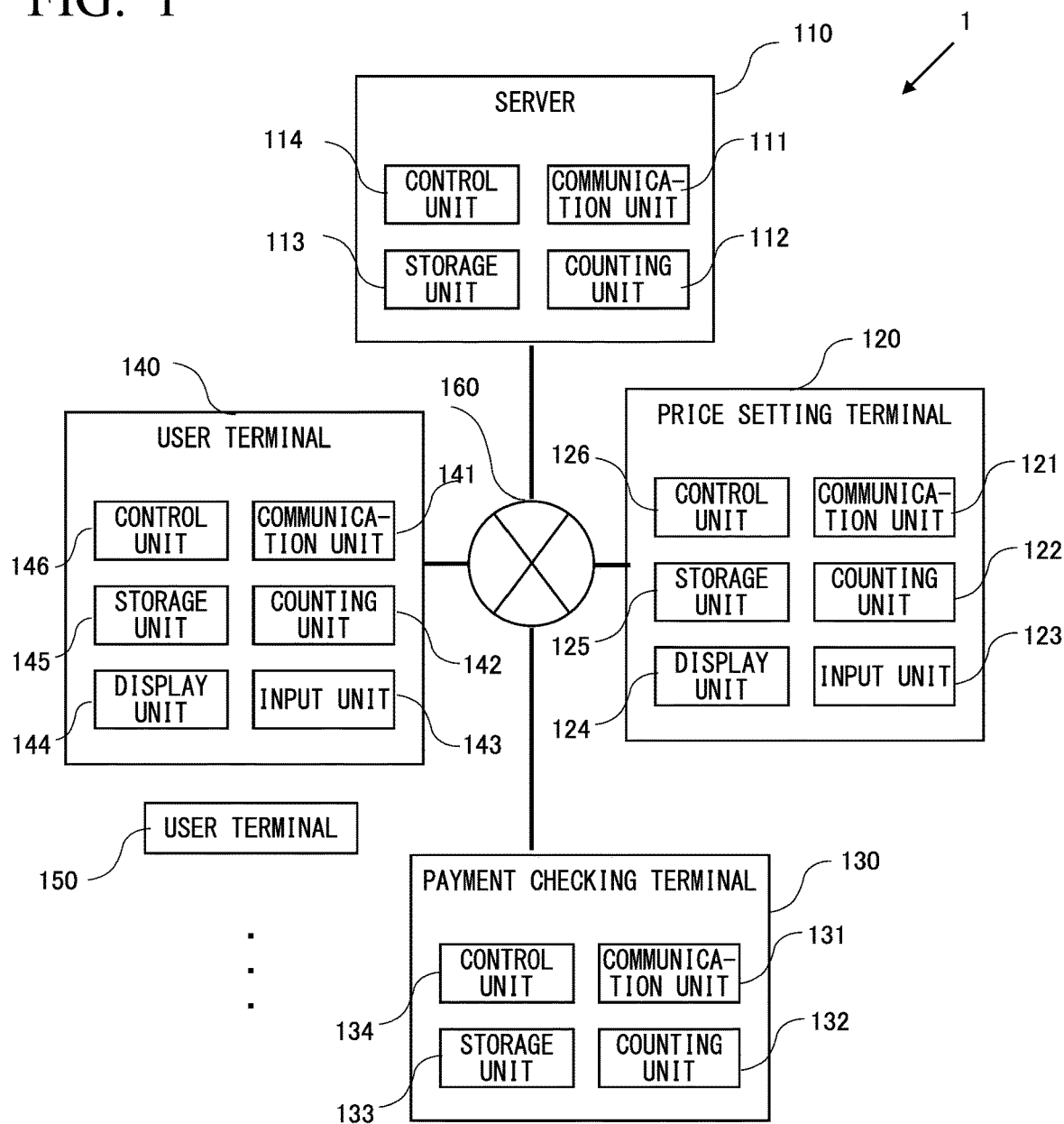
FIG. 1 is a block diagram showing a main part configuration of an object exchange assisting device according to one embodiment of the present invention.
FIG. 2A is a diagram showing the configuration of a user table according to one embodiment of the present invention.

FIG. 1 is a block diagram showing a main part configuration of an object exchange assisting device according to one embodiment of the present invention. As shown in FIG. 1, the object exchange assisting device according to this embodiment includes a server 110, a price setting terminal 120, a payment checking terminal 130, user terminals 140 and 150, and the like, and these components are communicatively connected through a communication network 160. An object for object exchange according to the present invention includes a product, a service, real estate, a right such as an intellectual property right, and the like.

The server 110 includes a communication unit 111, a counting unit 112, a storage unit 113, and a control unit 114. The communication unit 111 is composed of a network card and the like and communicates with the price setting terminal 120, the payment checking terminal 130, the user terminals 140 and 150, and the like through the communication network 160.

The counting unit 112 includes a counting circuit that counts the current date and time information and outputs the counted current date and time information to the control unit 114.

The storage unit 113 is configured using a data-readable/writable storage device such as a hard disk drive (HDD), a solid state drive (SSD), or the like and stores various kinds of data and programs (storage process). The storage unit 113 stores a user table 210, an object table 220, an exchange condition table 230, an exchange program, a price comparison program, and a payment amount calculating program to be described later.

The control unit 114 is composed of a central processing unit (CPU) or a graphics processing unit (GPU) and a random access memory (RAM). The control unit 114 expands data or a program stored in the storage unit 113 in the RAM and executes various processes.

The price setting terminal 120 includes a communication unit 121, a counting unit 122, an input unit 123, a display unit 124, a storage unit 125, and a control unit 126. The communication unit 121 is composed of a network card and the like and communicates with the server 110 through the communication network 160. The counting unit 122 includes a counting circuit that counts the current date and time information and outputs the counted current date and time information to the control unit 126.

The input unit 123 is composed of an input device such as a keyboard, a pointing device or the like and outputs an input signal from a device to the control unit 126. The display unit 124 is composed of a CRT display, a liquid crystal display, or the like and displays a signal from the control unit 126. The storage unit 125 stores a price database for each kind of object, a user table (FIG. 2A), an object table (FIG. 2B), an exchange condition table (FIG. 2C), a history table (FIG. 2D), and a price setting program to be described later. The control unit 126 has a configuration similar to that of the control unit 114 and expands data or a program stored in the storage unit 125 into a RAM and executes various processes.

The payment checking terminal 130 includes a communication unit 131, a counting unit 132, a storage unit 133, and a control unit 134.

The user terminal 140 includes a communication unit 141, a counting unit 142, an input unit 143, a display unit 144, a storage unit 145, and a control unit 146. The user terminal 140 is a portable terminal held by an individual user, the user terminal 150 and the other user terminals are similar to the user terminal 140, and there are a plurality of user terminals 140.

The communication network 160 may use any method as long as it is a means for delivering information and, for example, may be the Internet.

FIG. 2A is a diagram showing the configuration of a user table. FIG. 2B is a diagram showing the configuration of an object table. FIG. 2C is a diagram showing the configuration of an exchange condition table. FIG. 2D is a diagram showing the configuration of a history table.

The user table (FIG. 2A) includes items of a user ID 210, a name 211, an address 212, user information 213, an exchange condition ID 214, and a history ID 215. The user ID 210 is identification information of a user who exchanges an object. The name 211 is a name of a user having the user ID 210. The address 212 is an address of the user having the user ID 210.

The user information 213 is information including attributes other than the name and the address of the user having the user ID 210, for example, a user ID of a user with whom the user frequently performs exchange, a trend of a transaction-wanted object estimated from exchanges performed in the past, and the like. The exchange condition ID 214 is identification information of an exchange condition for each object owned by the user having the user ID 210. The history ID 215 is identification information of an exchange history of exchanges performed by the user having the user ID 210.

The object table (FIG. 2B) includes items of an object ID 220, an object name 221, a photograph 222, and object information 223. The object ID 220 is identification information of an object owned by a user. The object name 221 is a name of the object having the object ID 220. The photograph 222 is a file name of a photograph of an object having the object ID 220. The object information 223 is information including attributes other than a name and a photograph file name of the object ID 220, for example, a damage status, a manufacturing year, a use history, and the like.

The exchange condition table (FIG. 2C) includes items of an exchange condition ID 230, an object ID 231, an exchange repetition stop condition 232, a first price 233, a second price 234, an exchange wanted or exchange refusal condition 235, and an update time 236. The exchange condition ID 230 is identification information of an exchange condition that is set for each object. The object ID 231 is identification information of an object corresponding to an exchange condition of the exchange condition ID 230.

The exchange repetition stop condition 232 is a condition for stopping object exchange repetition and includes conditions for immediate stop, stop when a wanted object is obtained, stop after a designated time, stop after a set number of exchanges, stop when a first price of an object after an exchange exceeds a set price, and the like. The first price 233 is a price of an object ID 231 that is used when the object ID 231 is used as an exchange source and an object of another user is used as an exchange destination. The second price 234 is a price of the object ID 231 that is used when the object ID 231 is selected by another user as an exchange destination.

The exchange acceptance or exchange refusal condition 235 includes conditions for an object ID wanted for a bulk exchange, an object ID, an object attribute, a user ID, and a user attribute for which exchange is accepted or refused, an upper limit of the second price of an exchange destination, and the like. The update time 236 is a time when an exchange condition having an exchange condition ID 230 is updated or set.

The history table (FIG. 2D) includes items of a history ID 240, an exchange source user ID 241, an exchange destination user ID 242, an exchange source object ID 243, an exchange destination object ID 244, and an exchange time 245.

The history ID 240 is identification information of a history of object exchanges. The exchange source user ID 241 is a user ID of a user who has selected an object of another user as an exchange destination at the time of exchanging objects. The exchange destination user ID 242 is a user ID of a user who has exchanged objects with a user having the exchange source user ID 241 at the time of exchanging objects.

The exchange source object ID 243 is identification information of an object owned by a user having the exchange source user ID 241 before an exchange. The exchange destination object ID 244 is identification information of an object owned by a user having the exchange source user ID 241 before an exchange. The exchange time 245 is a time when an object exchange is performed.

[Exchange Program According to one Embodiment]

Figure 3:
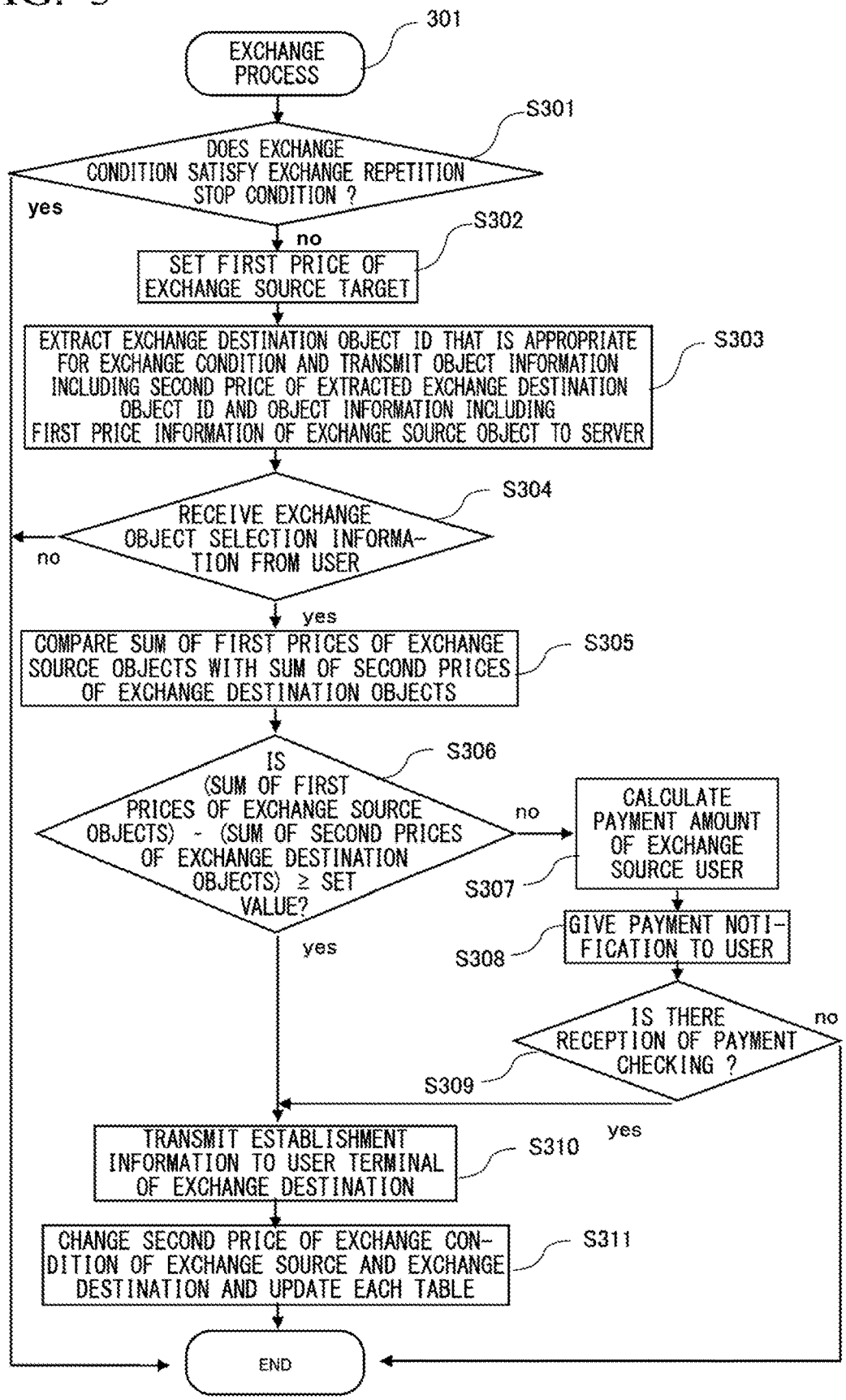
FIG. 3 is a flowchart showing an exchange process according to one embodiment of the present invention.

FIG. 3 is a flowchart showing an exchange process. The process of an object exchange will be described with reference to FIG. 3.

Here, it will be assumed in this description that users holding user terminals 140 and 150 are respectively referred to as an exchange source user and an exchange destination user, and an exchange source object owned by the exchange source user is exchanged with an exchange destination object owned by the exchange destination user. However, this similarly applies to other user terminals as well.

A user table, an object table, and an exchange condition table of the exchange source user and the exchange destination user have already been stored in the storage unit 113.

First, a new exchange condition is transmitted from the user terminal 140 held by the exchange source user to the server 110.

The control unit 114 executes an exchange program stored in the storage unit 113 with reception of the exchange condition in the control unit 114 (an appropriate exchange object selecting process) as a trigger.

Here, the exchange condition may not be input by the exchange source user. The control unit 114 may start an exchange program with reading of an exchange condition stored in the storage unit 113 at predetermined time intervals as a trigger instead of reception of an exchange condition from the exchange source user and may input a time for starting the exchange program as an exchange condition in advance. In addition, an exchange destination object ID and information relating to a difference amount between the second price of the exchange destination object ID and the first price of the exchange source object may be included as the exchange condition.

Furthermore, the object table (FIG. 2D) may be configured in advance such that it can be read from a user terminal, and an object ID of a selected object may be input as the exchange condition in accordance with a user selecting a photograph of the object using the user terminal.

The control unit 114 checks whether or not the exchange condition of the exchange source user satisfies the exchange repetition stop condition (Step S301). In a case in which the exchange repetition stop condition is not satisfied (Yes in Step S301), the control unit 114 transmits an object ID of the exchange source object of the exchange source user to the price setting terminal 120 using the communication unit 111 and the communication network 160.

In the price setting terminal 120, the control unit 126 starts the price setting program stored in the storage unit 125 with reception of an object ID of the exchange source object of the exchange source user through the communication network 160 in the communication unit 121 (a price setting process) as a trigger.

The control unit 126 sets first price information of the exchange source object in accordance with the price setting program using at least one of the user table (FIG. 2A), the object table (FIG. 2B), the exchange condition table (FIG. 2C), the history table (FIG. 2D), a price database for each kind of object, an input from the input unit that is input by a staff member responsible for price setting on the basis of object information of the received object ID, which are stored in the storage unit 125, and transmits the set first price information to the server 110 using the communication unit 121.

The server 110 receives the first price of the exchange source object transmitted from the price setting terminal 120 through the communication network 160 using the communication unit 111, and the control unit 114 inputs the received first price to the exchange condition table corresponding to the exchange source object that is stored in the storage unit 113. Alternatively, in a case in which the first price stored in the exchange condition table corresponding to the exchange source object has been input in advance, the first price stored in advance is changed to a first price that is newly received from the price setting terminal 120 (a price changing process) (Step S302). In addition, the price setting process according to the present invention includes the price changing process.

Here, although the server 110 has been described as setting a first price in accordance with reception of an exchange condition, the server 110 may be configured to automatically update a first price stored in the storage unit in accordance with reception of the first price from the price setting terminal 120 using the reception unit at predetermined intervals, and in a case in which a time at which the exchange condition is received from the exchange source user is within a predetermined time from a time at which the server 110 has updated the first price, the stored first price may be used (a reception process).

In a case in which the exchange repetition stop condition is satisfied (No in Step S301), the exchange program ends.

Then, the control unit 114 reads an exchange condition table, a user table, and an object table of the exchange source user and other users stored in the storage unit 113 in accordance with the exchange program, extracts an exchange destination object ID that is appropriate for the exchange condition of the exchange source user, and transmits object information including a second price of the extracted exchange destination object ID and the object information including the first price of the exchange source object to the user terminal 140 of the exchange source user terminal using the communication unit 111 (Step S303). At that time, information relating to a difference between the prices may be transmitted without transmitting the second price of the extracted exchange destination object ID and the first price of the exchange source object. The extraction of the exchange destination object ID, for example, may be performed in order of the highest to lowest sum of points by configuring points based on whether or not an object is wanted by an exchange source user, whether or not an object relates to the wanted object, a rank from the lowest second price, a complementary relation with an object owned by the exchange source user, an exchange destination object ID directly designated by the exchange source user, and the like.

The user terminal 140 displays the object information including the second price of the extracted exchange destination object ID and the object information including the first price of the exchange source object, which have been received, on the display unit 144 with reception of the transmitted information through the communication network 160 in the communication unit 141 as a trigger. At that time, information relating to a difference between the prices may be displayed without displaying the second price of the extracted exchange destination object ID and the first price of the exchange source object.

The exchange source user checks the object information including the second price of the exchange destination object ID and the object information including the first price of the exchange source object or the information relating to a difference between the second price of the exchange destination object ID and the first price of the exchange source object displayed on the display unit 144 and inputs an object ID of the exchange source object and an object ID of the exchange destination object that he or she will use for an exchange using the input unit 143. The control unit 146 transmits the object ID of the exchange source object and the object ID of the exchange destination object, which have been input, to the server 110 using the communication unit 141.

Here, a plurality of objects IDs of exchange source objects and a plurality of object IDs of exchange destination objects may be selected.

The control unit 114 executes a price comparison program stored in the storage unit 113 with reception (Step S304) of the object ID of the exchange source object and the object ID of the exchange destination object transmitted from the communication unit 141 through the communication network 160 (Yes in Step S304) as a trigger.

In a case in which information of selection of exchange objects has not been received from the exchange source user (No in Step S304), the exchange program ends.

The control unit 114 executes the price comparison program stored in the storage unit 113 and compares a sum of first prices of exchange source objects and a sum of second prices of exchange destination objects, which have been received, with each other (Step S305) (a price comparison process).

The control unit 114 checks whether or not a difference of the sum of first prices of exchange source objects from the sum of second prices of exchange destination objects is equal to or larger than a set value using the price comparison program (Step S306). In a case in which the difference is equal to or larger than the set value (Yes in Step S306), the control unit 114 transmits exchange establishment information to the user terminal 150 of the exchange destination using the communication unit 111. Here, the exchange establishment information may be transmitted to the user terminal 140 of the exchange source, or the exchange establishment information may not be transmitted to the user terminal 150 of the exchange destination.

In a case in which the difference is smaller than the set value (No in Step S306), the control unit 114 executes a payment amount calculating program stored in the storage unit 113, calculates a payment amount of the exchange source user (Step S307) (a payment amount calculating process), and transmits a payment notification including the calculated payment amount to the user terminal 140 of the exchange source user using the communication unit 111.

The payment notification transmitted from the communication unit 111 is received by the communication unit 141 of the user terminal 140 through the communication network 160, the payment notification is displayed on the display unit 144 by the control unit 146, and the payment notification is notified to the exchange source user (Step S308) (a transmission process).

Here, the payment notification is a notification using a general calculation system using a network such as a transfer request using a bank system, a card payment request using a system of a credit card company, a payment request of electronic money, or the like.

Thereafter, payment of the exchange source user is checked by the payment checking terminal 130 (Step S309). The payment checking terminal 310 is a terminal of a general calculation system using a network, the general calculation system is a bank system, a credit card company system, or an electronic money company system, and the payment checking information of the exchange source user is received by the server 110 through the communication unit 131. Here, entrusted money entrusted by the exchange source user in advance, pre-paid electronic money, points, and the like may be used. At that time, a payment notification may not be notified to the exchange source user. In addition, a deposit may be prepared in an account.

The control unit 134 checks reception/no-reception of payment checking (Step S309) (a payment checking process). When there is reception thereof, the control unit 134 transmits payment checking information to the server 110 using the communication unit 131 (Yes in Step S309). The control unit 114 of the server 110 transmits exchange establishment information to the user terminal 150 of the exchange destination using the communication unit 111 with reception of the payment checking information from the communication unit 131 through the communication network 160 in the communication unit 111 as a trigger (Step S310).

Here, in a case in which there is no reception of payment checking in the control unit 134, the exchange program ends (No in Step S309).

After Step S310, by using the exchange program, the control unit 114 sets a second price (a second price 234 of the exchange condition table (FIG. 2C)) of each exchange condition ID corresponding to each of the exchange source object ID and the exchange destination object ID stored in the storage unit 113 to a highest price among the first price and the second price of the exchange source object before the exchange and the first price of the exchange destination object before the exchange (a setting process).

Furthermore, the object ID 231 of the exchange condition table (FIG. 2C) stored in the storage unit 113 is updated with the object ID after exchange by the control unit 114, the history table (FIG. 2D) is updated, the history ID of the user table (FIG. 2A) is updated (Step S311), and the exchange program ends.

[Example of Exchange]

One specific example of an object exchange will be described with reference to FIGS. 2A, 2B, 2C, and 2D. It is assumed that the items of the user table (FIG. 2A), the product table (FIG. 2B), the exchange condition table (FIG. 2C), and the history table (FIG. 2D) have already been input. First, a user having a user ID of "U1001" (hereinafter, referred to as a user U1001) performs a process of changing the exchange wanted or exchanged refusal condition 235 of the exchange condition T2011.

The server 110 receives the process of changing the exchange condition T2011, starts the exchange program, selects products that are appropriate for the exchange condition T2011 of the user U1001 (product IDs: G1011 and G1012), and transmits product information including a first price of the set condition T2011 and second prices of the product IDs G1011 and G1012 to the user U1001.

The user U1001 selects the product IDs G1011 and G1012 as exchange destinations, and a sum of the second prices of the exchange destinations (exchange conditions T2012 and T2015 and the same products G1010 and G1012), which is 6000 Yen, is compared with the first price of the exchange source (an exchange condition T2011 and the same product G1010) which is 7000 Yen. Here, in a case in which the set value is 500 Yen, an exchange is established without payment from the user U1001.

The user U1001 becomes the owner of the products G1010 and G1012, and the user U1002 becomes the owner of the product G1010.

The exchange conditions T2012 and T2015 of the user U1002 who has obtained a trading card A (TDC-A) through an exchange are exchange repetition stop conditions (at the time of obtaining TDC (trading card)-A), and accordingly, the exchange repetition immediately stops. On the other hand, since there is no exchange repetition stop condition in the exchange condition T2011 of the user U1001, the product continuously becomes a target for an object exchange.

As above, although the information processing device according to one embodiment of the present invention has been described, the present invention is not limited to the embodiment described above, and changes therein can be freely made within the range of the present invention.

For example, the second price described above may be set by a user using a user terminal owing the product, and the price setting terminal described above may set the second price described above.

In addition, an exchange stop condition for stopping repetition of a product exchange such as a product of which a subsequent exchange after an exchange is wanted to stop, a time at which an exchange stops, the number of exchanges until stopping an exchange, or the like may be included as the exchange condition described above.

In addition, at least any one of the control unit 126, the storage unit 125, and the counting unit 122 of the price setting terminal 120 may be included in the server 110.

The payment amount described above is set to zero in a case in which a difference of a sum of second prices of products of the exchange destination from a sum of first prices of products of the exchange source is equal to or smaller than a predetermined value, notifies the payment amount to the exchange source user, and performs payment checking.

The control unit 114 has been described to check whether or not the difference of the sum of first prices of exchange source products from the sum of second prices of exchange destination products is equal to or larger than a set value using the price comparison program (Step S306) and transmit exchange establishment information to the user terminal 150 of the exchange destination in a case in which the difference is equal to or larger than the set value (Yes in Step S306). However, even in a case in which the difference is equal to or larger than the set value, a predetermined fee may be set as a payment amount of the exchange source user and be notified to the user (Step S308).

In addition, the object name 221, the photograph 222, and the object information 223 may be input by a user owning an object using the user terminal 140 or may be input by a staff member responsible for object storage and management using an object storing and managing terminal that stores and manages an object.

Furthermore, the user information 213 may not be included in the user table (FIG. 2A).

The price may be on the basis of legal currency issued by a country or a regional cooperative organization or virtual currency such as Bitcoin.

In addition, the information of the user table (FIG. 2A), the product table (FIG. 2B), the exchange condition table (FIG. 2C), the history table (FIG. 2D), and the like relating to an object exchange may be managed on a block chain using a plurality of servers 110, a plurality of user terminals, and the like.

In the embodiment described above, although a case in which the history table (FIG. 2D) and the like relating to a transaction are uniformly managed in the server 110 has been described as an example, the history table (FIG. 2D) and the like may be distributed and managed using a block chain.

(Block Chain)

A block chain network maintaining a block chain is built on a network, which mainly uses peer-to-peer communication, connected to the communication network 160. A user terminal 140 and a server 110 may be included in the block chain network.

The maintenance of information using a block chain is performed by adding a block formed by a header including a transaction that is a list of transactions within a predetermined time and information relating to a previous block to a block until now. Since the block chain is maintained in all the terminals included in the block chain network, there are advantages that it is difficult to falsify information, and a history of transactions remains.

For example, payment checking is necessary at the center (a main server of a business operator), and an approval for addition of a block to a block chain can be performed, which will be described below in a case in which a private-type block chain (i) of only a central terminal is premised.

As one example, in a case in which a history of object exchanges is maintained in a block chain, information including an exchange source user ID, an exchange destination user ID, an exchange source object ID, and an exchange destination object ID of a history table (FIG. 2D) is maintained on the block chain as a transaction.

After payment is checked in Step S309 of the exchange program, the server 110 broadcasts transactions relating to a series of exchange transactions to the block chain network, whereby the block chain is updated.

In addition, when an exchange destination object ID that is appropriate for an exchange condition of the exchange source user is extracted, and object information is transmitted to the user terminal 140 of the exchange source user terminal using the communication unit 111 (Step S303), the exchange destination object ID may be verified by checking a transaction including the exchange destination object ID of the block chain using the control unit 114 of the server 110.

It is apparent that information of the product table (FIG. 2B), the exchange condition table (FIG. 2C), and the like may be included in the block chain.

In a case in which the payment checking is performed by a member other than the center (the main server of the business operator), and a payment checking terminal side other than the center can approve addition of a block to the block chain (ii), when the payment checking terminal 130 is connected to the block chain network, the payment checking terminal 130 may update the block chain after the payment checking terminal 130 checks the payment (Step S309).

In a case in which it is not necessary to perform payment checking (a public type (iii)) such as a case in which there is no payment amount, a case in which payment is made using a deposit or the like, or the like, the process is performed as below.

In addition, in a case in which information including a user ID, an object ID, a first price, and a second price is maintained on the block chain, and an amount of money for payment is charged using a deposit or the like or a total amount of payment of the same user ID that has not been paid is equal to or smaller than a predetermined amount, the block chain may be updated from the exchange source user terminal 140 without checking payment in Step S309 of the exchange program. At that time, the second price may be calculated on the basis of a history of previous first prices and the like associated with the exchange source object ID on the block chain.

In addition, a smart contract that is a program capable of performing automatic execution using the block chain described above may be used in a step of performing an exchange process on the basis of an exchange condition.

The present invention is not limited to a retail product and the like and can be applied to various objects for an object exchange. For example, as applicable objects, there are a coupon, a note, a ticket, a material such as water, air, mineral, or the like, real estate, and rights such as a right of pledge, credit, an intellectual property right, and the like. In addition, the present invention can be used such that assets such as products and the like distributed in a plurality of departments within the same organization and rescue resources at the time of a disaster are rearranged to appropriate departments or users.

According to the present invention, a new program and the like can be introduced to a system, and particularly, machine learning such as deep learning or the like may be used for an appropriate exchange product selecting unit selecting an exchange object in accordance with a user's preference, a price setting terminal, an object storing and managing terminal storing and managing an object, and the like.

[Advantage of Invention]

According to this embodiment, a user owning an object can set a second price corresponding to a selling price of the object that he or she owns, and, when the user wants to exchange the object with an object of another user, the user can freely select an object of an exchange destination by paying a difference from a first price corresponding to an evaluated value of the object that he or she owns.

INDUSTRIAL APPLICABILITY

According to the present invention, an information processing device capable of performing an object exchange that can be continued a plurality of number of times without an approval of an exchange destination can be provided.

What is claimed is:

1. An information processing device for performing an object exchange, the information processing device comprising:
  a computer-readable medium including executable instructions stored in a storage device, and
  a processor configured to perform the executable instructions and to store data representing object IDs of determined objects, user IDs of users owning determined objects, exchange destination prices for each determined object, exchange source prices for each determined object, exchange conditions associated with each determined object, and an ownership information that represents relations between the user IDs and the object IDs, and is also configured to store user information in association with the user IDs, and store object information in association with the object IDs,
  wherein the executable instructions cause the processor to:
  receive the exchange destination price from a user's computing device associated with the user owning an object, wherein the user's computing device is not provided with the exchange source price of another user's object;
  receive the exchange condition associated with the another user's object from another user's computing device associated with the another user owning the another user's object;
  perform matching to determine a matching exchange object in accordance with data representing the exchange condition associated with the another user's object;
  determine the exchange source prices of each determined object without displaying the exchange source prices to the users involved in the transaction;
  display, to the another user, a difference amount between the exchange destination price of the matching exchange object that includes at least the user's object, and the exchange source price of the another user's object, without displaying the exchange destination price of the user's object and the exchange source price of the another user's object;
  receive, from the another user's computing device, the user's object selected by the another user, as an exchange destination object in an exchange in which an execution of an exchange program is triggered due to only the exchange condition associated with the another user's object;
  compare the exchange destination price of the user's object with the exchange source price of the another user's object;

determine a payment amount from the another user owning the another user's object;
check a first payment information from the another user owning the another user's object;
in response to the selecting of the user's object by the another user, and the checking the first payment information confirming receipt of a payment from the another user,
update a table containing the ownership information to reflect new relations between the object IDs and the user IDs after checking the first payment information to generate an updated table; based on the updated table,
determine that (i) the exchange destination price of the user's object is lower than the exchange source price of the another user's object and (ii) a difference between the exchange destination price of the user's object and the exchange source price of the another user's object exceeds a set value, and
based on the determining the (i) and the (ii), initiate an operation to transfer the user's object to the another user and the another user's object to the user; and
execute an exchange of the objects between the users, without a financial transaction to the another user owning the another user's object from the user owning the user's object.

2. The information processing device according to claim 1, wherein the exchange conditions include stored data representing an exchange stop condition associated with stopping a repetition of the object exchange.

3. The information processing device according to claim 2, further comprising:
if the exchange stop condition is not reached for the exchange condition associated with the user's object:
the processor is configured to select a third-party's object as an exchange destination object in which an execution of the exchange program is triggered due to the exchange condition of the user's object;
the processor is configured to compare an exchange destination price of the third-party's object with the exchange source price of the user's object;
the processor is configured to determine a payment amount from the user owning the user's object;
the processor is configured to check the third-party user's payment information from the user owning the user's object; and
the processor is configured to further update the table containing the ownership information to reflect new relations between the object IDs of the user's object and the third-party user's object and user IDs showing current ownerships of the user's object and the third-party user's object after checking the third-party user's payment information
wherein user's object becomes the third-party user's new object and third-party user's object becomes user's new object.

4. The information processing device according to claim 1,
wherein the user's object includes a plurality of user's objects,
wherein the processor is configured to select the plurality of user's objects, and
wherein the processor is configured to compare a price acquired by summing up exchange destination prices associated with the plurality of user's objects with the exchange source price of the another user's object.

5. The information processing device according to claim 1,
wherein processor is further configured to store data representative of:
a history ID associated with an exchange source user ID,
an exchange destination user ID,
an exchange source object ID, and
an exchange destination object ID at a time of an exchange, and is also configured to store user information in association with the user ID, and store object information in association with the object ID.

6. The information processing device according to claim 5, wherein the processor is configured to use at least one of the user information, the object information, the exchange conditions, the history ID, an input from an input unit of the processor, and a price database stored in a storage device of the processor.

7. The information processing device according to claim 6, wherein the price database stored in the storage device of the processor includes the object information and the exchange destination prices.

8. The information processing device according to claim 1, wherein the information processing device comprises a server.

9. The information processing device according to claim 1, wherein the payment amount is set to zero when a difference of a sum of second prices of objects of the exchange destination from a sum of first prices of the object of the exchange source is equal to or smaller than a predetermined value, and an exchange is established without payment from the user or the another user.

10. The information processing device according to claim 1, wherein the processor is configured to store and manage the objects, wherein the user's object and the another user's object comprise at least one of a retail product, a material and a right.

11. The information processing device according to claim 1, wherein the processor is configured to store a block chain formed from a block including update information of information stored in the storage device.

12. The information processing device according to claim 1, based on the determination that the exchange destination price of the user's object is lower than the exchange source price of the another user's object, representing the new relations without any payment from the user owning the user's object, and determining the payment amount from the another user owning the another user's object to be more than zero.

13. The information processing device according to claim 1, wherein the processor is configured to represent the new relations without any input of the user owning the user's object.

14. The information processing device according to claim 13, wherein the processor is configured to select the user's object as the exchange destination object based on a reception of an input of the another user owning the another user's object.

15. The information processing device according to claim 1, wherein the processor is configured to receive the exchange destination price of the user's object from a computing device associated with the user owning the user's object or to determine the exchange destination price of the user's object.

16. The information processing device of claim 1,
wherein user's object becomes another user's new object and another user's object becomes user's new object, wherein the object IDs further include a third-party's object,
the user IDs further include a third-party user owning the third-party's object,
the exchange destination prices further include the third-party's object,
the exchange source prices further include the third-party's object,
the exchange conditions are further associated between the user's new object,
the another user's new object, and the third-party's object, and is also configured to store user information in association with the user IDs of the user, another user and third-party users, and store object information in association with the object IDs of the objects,
wherein the executable instructions further comprise performing the following operations after the executing the exchange of the user's new object and the another user's new object between the user and the another user:
receiving the exchange destination price from the another user's computing device associated with the another user owning the another user's new object that was exchanged from the user, wherein the another user's computing device is not provided with the exchange source price;
receiving the exchange condition associated with the another user's new object from the another user's computing device associated with the another user owning the another user's new object;
performing matching to determine another matching exchange object in accordance with data representing the exchange condition associated with the another user's new object;
determining the exchange source prices of the another user's new object and the third party's object without displaying the exchange source prices to the another user and the third-party user;
displaying, to the another user, another difference amount between the exchange destination price of the matching exchange object that includes at least the third-party's object, and the exchange source price of the another user's new object, without displaying the exchange destination price of the third-party's object and the exchange source price of the first another user's new object;
receiving, from the another user's computing device, the third-party's object selected by the another user, as another exchange destination object in another exchange in which the execution of the exchange program is triggered due to only the exchange condition associated with the another user's new object;
comparing the exchange destination price of the third-party's object with the exchange source price of the another user's new object;
determining another payment amount from the another user owning the another user's new object;
checking a second payment information from the another user owning the another user's new object;
in response to the selecting, and receiving another payment from the another user, updating the table containing the ownership information to reflect new relations between the object IDs and the user IDs after checking the second payment information to generate the updated table; based on the updated table, determining that (i) the exchange destination price of the third-party's object is lower than the exchange source price of the another user's new object and (ii) a difference between the exchange destination price of the third-party's object and the exchange source price of the another user's new object exceeds another set value, and based on the determining the (i) and the (ii), initiating another operation to transfer the third-party's object to the another user and the another user's new object to the third-party user; and
executing another exchange of the another user's new object and the third-party's object between the another user and the third-party user, without another financial transaction between the another user owning the another user's new object and the third-party user owning the third-party's object.

17. The information processing device according to claim 1, wherein initiating the operation to transfer the user's object to the another user and the another user's object to the user is performed automatically without an instruction from the user or the another user.

18. A non-transitory computer readable medium configured to execute stored instructions comprising:
storing data representing:
object IDs of a user's object and another user's object, user IDs of the user owning the user's object and the another user owning the another user's object, exchange destination prices of both the user's object and the another user's object, exchange source prices of both the user's object and the another user's object, exchange conditions associated with the user's object and the another user's object, an ownership information that represents relations between the user IDs and the object IDs, and user information in association with the user IDs, and store object information in association with the object IDs;
receiving the exchange destination price from a user's computing device associated with the user owning the user's object, wherein the user's computing device is not provided with the exchange source price;
receiving the exchange condition associated with the another user's object from another user's computing device associated with the another user owning the another user's object;
performing matching to determine a matching exchange object in accordance with data representing the exchange condition associated with the another user's object;
determining the exchange source prices of the user's object and the another user's object without displaying the exchange source prices to the user and the another user;
displaying, to the another user, a difference amount between the exchange destination price of the matching exchange object that includes at least the user's object, and the exchange source price of the another user's object, without displaying the exchange destination price of the user's object and the exchange source price of the another user's object;
receiving, from the another user's computing device, the user's object selected by the another user, as an exchange destination object in an exchange in which an execution of an exchange program is triggered due to only the exchange condition associated with the another user's object;
comparing the exchange destination price of the user's object with the exchange source price of the another user's object;

determining a payment amount from the another user owning the another user's object;

checking a first payment information from the another user owning the another user's object;

in response to the selecting, and receiving a payment from the another user, updating a table containing the ownership information to reflect new relations between the object IDs and the user IDs after checking the first payment information to generate an updated table;

based on the updated table, determining that (i) the exchange destination price of the user's object is lower than the exchange source price of the another user's object and (ii) a difference between the exchange destination price of the user's object and the exchange source price of the another user's object exceeds a set value, and based on the determining the (i) and the (ii), initiating an operation to transfer the user's object to the another user and the another user's object to the user; and executing an exchange of the user's object and the another user's object between the user and the another user, without a financial transaction between the another user owning the another user's object and the user owning the user's object.

* * * * *